United States Patent [19]

Matsumoto

[11] Patent Number: 5,680,529
[45] Date of Patent: Oct. 21, 1997

[54] IMAGE REDUCTION CONVERSION METHOD

[75] Inventor: Hiroyuki Matsumoto, Yokohoma, Japan

[73] Assignee: Nippon Telegraph and Telephone Corporation, Tokyo, Japan

[21] Appl. No.: 611,503

[22] Filed: Mar. 6, 1996

Related U.S. Application Data

[63] Continuation of Ser. No. 79,450, Jun. 21, 1993, abandoned.

[30] Foreign Application Priority Data

Jun. 22, 1992 [JP] Japan ................... 4-162550

[51] Int. Cl.⁶ .............................. G06T 3/40
[52] U.S. Cl. .......................... 395/139; 395/128
[58] Field of Search ................. 395/128, 139; 345/127; 358/451; 382/298

[56] References Cited

U.S. PATENT DOCUMENTS

| | | | |
|---|---|---|---|
| 4,827,352 | 5/1989 | Yoneda et al. | 358/451 X |
| 4,872,064 | 10/1989 | Tutt et al. | 382/298 |
| 4,970,604 | 11/1990 | Coueignoux | 358/426 |
| 5,054,099 | 10/1991 | Wakabayashi et al. | 382/298 |
| 5,121,222 | 6/1992 | Endoh et al. | 358/451 |
| 5,138,672 | 8/1992 | Hirabayashi et al. | 382/298 |
| 5,159,468 | 10/1992 | Yoshida et al. | 358/451 |
| 5,161,035 | 11/1992 | Muramatsu | 358/451 |
| 5,271,072 | 12/1993 | Yoshida et al. | 358/451 X |
| 5,282,057 | 1/1994 | Mailloux et al. | 358/451 X |
| 5,359,672 | 10/1994 | Okumura et al. | 382/168 |
| 5,367,615 | 11/1994 | Economy et al. | 395/128 X |
| 5,396,584 | 3/1995 | Lee et al. | 395/128 X |
| 5,410,615 | 4/1995 | Mailloux | 382/299 |
| 5,418,894 | 5/1995 | Kitamura et al. | 395/139 X |
| 5,475,809 | 12/1995 | Sato | 395/170 |
| 5,491,769 | 2/1996 | Moller | 395/139 |
| 5,555,557 | 9/1996 | Mailloux | 382/299 |

*Primary Examiner*—Anton W. Fetting
*Attorney, Agent, or Firm*—Finnegan, Henderson, Farabow, Garrett & Dunner, L.L.P.

[57] ABSTRACT

It is the object of the present invention to perform reduction conversion processing while suppressing the loss of fine line when carrying out the reduction conversion of an image expressing in binary values. The present invention has a reduction operator which logically calculates the value of a converted pixel from a detection of fine lines in the vertical or diagonal direction, a detection of fine lines in the horizontal or diagonal direction and from the value of the original pixel closest to the converted pixel, within a limited region wherein the main scanning pixel number is 2N and the sub-scanning pixel number is 2N original pixels.

7 Claims, 19 Drawing Sheets

| REDUCTION RATIO AND REFERENCE ORIGINAL PIXELS CORRESPONDING TO REDUCTION RATIO | FINE LINE PATTERNS FIG.10 THROUGH FIG.15 |
|---|---|
| REDUCTION RATIO = 1/2  | P1 |
| REDUCTION RATIO = 1/3  | P1, P2<br>P11 |
| REDUCTION RATIO = 1/4  | P1, P2, P3<br>P11, P12<br>P21 |

FIG. 4A $P1 = Y0,0 \cap Y1,0 \cap Y2,0 \cap (\overline{Y0,1} \cup \overline{Y1,1} \cup \overline{Y2,1}) \cap (\overline{Y0,-1} \cup \overline{Y1,-1} \cup \overline{Y2,-1})$
$\cap U Y0,0 \cap U Y0,-1 \cap (\overline{Y-1,0} \cup \overline{Y-1,-1} \cup \overline{Y1,-1} \cup \overline{Y1,-2})$ $P2 = Y0,0 \cap Y-2,0 \cap Y-1,0 \cap (\overline{Y-2,1} \cup \overline{Y-1,1} \cup \overline{Y0,1}) \cap (\overline{Y-2,-1} \cup \overline{Y-1,-1} \cup \overline{Y0,-1})$
$\cap U Y0,0 \cap U Y0,2 \cap U Y0,1 \cap (\overline{Y-1,2} \cup \overline{Y-1,1} \cup \overline{Y1,1} \cup \overline{Y1,0})$ $P3 = Y1,0 \cap Y2,0 \cap Y3,0 \cap (\overline{Y1,1} \cup \overline{Y2,1} \cup \overline{Y3,1}) \cap (\overline{Y1,-1} \cup \overline{Y2,-1} \cup \overline{Y3,-1})$
$\cap U Y0,-1 \cap U Y0,-2 \cap U Y0,-3 \cap (\overline{Y-1,-1} \cup \overline{Y-1,-2} \cup \overline{Y-1,-3})$
$\cap U Y1,-1 \cup U Y1,-2 \cup U Y1,-3)$ $P4 = Y-1,0 \cap Y-3,0 \cap Y-2,0 \cap (\overline{Y-3,1} \cup \overline{Y-2,1} \cup \overline{Y-1,1})$
$\cap (\overline{Y-3,-1} \cup \overline{Y-2,-1} \cup \overline{Y-1,-1}) \cap U Y0,1 \cap U Y0,3 \cap U Y0,2 \cap (\overline{Y-1,3} \cup \overline{Y-1,2} \cup \overline{Y-1,1})$
$\cap (\overline{Y1,3} \cup \overline{Y1,2} \cup \overline{Y1,1})$ $P5 = Y2,0 \cap Y3,0 \cap Y4,0 \cap (\overline{Y2,1} \cup \overline{Y3,1} \cup \overline{Y4,1}) \cap (\overline{Y2,-1} \cup \overline{Y3,-1} \cup \overline{Y4,-1})$
$\cap U Y0,-2 \cap U Y0,-3 \cap U Y0,-4 \cap (\overline{Y-1,-2} \cup \overline{Y-1,-3} \cup \overline{Y-1,-4})$
$\cap (\overline{Y1,-2} \cup \overline{Y1,-3} \cup \overline{Y1,-4})$ $P11 = Y0,0 \cap Y1,0 \cap Y2,0 \cap Y3,0 \cap (\overline{Y0,1} \cup \overline{Y1,1} \cup \overline{Y2,1} \cup \overline{Y3,1})$
$\cap (\overline{Y0,-1} \cup \overline{Y1,-1} \cup \overline{Y2,-1} \cup \overline{Y3,-1}) \cup U Y0,0 \cap U Y0,-1 \cap U Y0,-2 \cap U Y0,-3$
$\cap (\overline{Y-1,0} \cup \overline{Y-1,-1} \cup \overline{Y-1,-2} \cup \overline{Y-1,-3})$
$\cap (\overline{Y1,0} \cup \overline{Y1,-1} \cup \overline{Y1,-2} \cup \overline{Y1,-3})$

FIG. 4B

$$P12 = Y0,0 \cap \overline{Y-3,0} \cap \overline{Y-2,0} \cap Y-1,0 \cap (Y-3,1 \cup \overline{Y-2,1} \cup Y-1,1 \cup Y0,1)$$
$$\cap (\overline{Y-3,-1} \cup Y-2,-1 \cup Y-1,-1 \cup \overline{Y0,-1}) \cup Y0,0 \cap Y0,3 \cap Y0,2 \cap Y0,1$$
$$\cap (Y-1,3 \cup Y-1,2 \cup Y-1,1 \cup \overline{Y-1,0}) \cap (\overline{Y1,3} \cup Y1,2 \cup Y1,1 \cup Y1,0)$$

$$P13 = Y1,0 \cap \overline{Y2,0} \cap \overline{Y3,0} \cap Y4,0 \cap (Y1,1 \cup \overline{Y2,1} \cup \overline{Y3,1} \cup Y4,1)$$
$$\cap (\overline{Y1,-1} \cup Y2,-1 \cup Y3,-1 \cup \overline{Y4,-1}) \cup Y0,-1 \cap \overline{Y0,-2} \cap \overline{Y0,-3} \cap Y0,-4$$
$$\cap (\overline{Y-1,-1} \cup Y-1,-2 \cup Y-1,-3 \cup \overline{Y-1,-4}) \cap (Y1,-1 \cup \overline{Y1,-2} \cup \overline{Y1,-3} \cup Y1,-4)$$

$$P14 = Y-1,0 \cap \overline{Y-4,0} \cap \overline{Y-3,0} \cap Y-2,0 \cap (Y-4,1 \cup \overline{Y-3,1} \cup \overline{Y-2,1} \cup Y-1,1)$$
$$\cap (\overline{Y-4,-1} \cup Y-3,-1 \cup Y-2,-1 \cup \overline{Y-1,-1}) \cup Y0,1 \cap Y0,4 \cap Y0,3 \cap Y0,2$$
$$\cap (\overline{Y-1,4} \cup Y-1,3 \cup Y-1,2 \cup Y-1,1) \cap (Y1,4 \cup Y1,3 \cup Y1,2 \cup Y1,1)$$

FIG. 5A $P21 = Y0,0 \cap Y1,0 \cap Y2,0 \cap Y3,0 \cap Y4,0 \cap \overline{(Y0,1 \cup Y1,1 \cup Y2,1 \cup Y3,1 \cup Y4,1)}$
$\cap \overline{(Y0,-1 \cup Y1,-1 \cup Y2,-1 \cup Y3,-1 \cup Y4,-1)} \cup Y0,0 \cap Y0,-1 \cap Y0,-2 \cap Y0,-3 \cap Y0,-4$
$\cap \overline{(Y-1,0 \cup Y-1,-1 \cup Y-1,-2 \cup Y-1,-3 \cup Y-1,-4)}$
$\cap \overline{(Y1,0 \cup Y1,-1 \cup Y1,-2 \cup Y1,-3 \cup Y1,-4)}$ $P22 = Y0,0 \cap Y-4,0 \cap Y-3,0 \cap Y-2,0 \cap Y-1,0 \cap \overline{(Y-4,1 \cup Y-3,1 \cup Y-2,1 \cup Y-1,1 \cup Y0,1)}$
$\cap \overline{(Y-4,-1 \cup Y-3,-1 \cup Y-2,-1 \cup Y-1,-1 \cup Y0,-1)} \cup Y0,0 \cap Y0,0 \cap Y0,2 \cap Y0,3 \cap Y0,4 \cap Y0,5$
$\cap \overline{(Y-1,4 \cup Y-1,3 \cup Y-1,2 \cup Y-1,1 \cup Y-1,0)} \cap \overline{(Y1,4 \cup Y1,3 \cup Y1,2 \cup Y1,1 \cup Y1,0)}$ $P23 = Y1,0 \cap Y2,0 \cap Y3,0 \cap Y4,0 \cap Y5,0 \cap \overline{(Y1,1 \cup Y2,1 \cup Y3,1 \cup Y4,1 \cup Y5,1)}$
$\cap \overline{(Y1,-1 \cup Y2,-1 \cup Y3,-1 \cup Y4,-1 \cup Y5,-1)} \cup Y0,-1 \cap Y0,-2 \cap Y0,-3 \cap Y0,-4 \cap Y0,-5$
$\cap \overline{(Y-1,-1 \cup Y-1,-2 \cup Y-1,-3 \cup Y-1,-4 \cup Y-1,-5)}$
$\cap \overline{(Y1,-1 \cup Y1,-2 \cup Y1,-3 \cup Y1,-4 \cup Y1,-5)}$ $P31 = Y0,0 \cap Y1,0 \cap Y2,0 \cap Y3,0 \cap Y4,0 \cap Y5,0 \cap \overline{(Y0,1 \cup Y1,1 \cup Y2,1 \cup Y3,1 \cup Y4,1 \cup Y5,1)}$
$\cap \overline{(Y0,-1 \cup Y1,-1 \cup Y2,-1 \cup Y3,-1 \cup Y4,-1 \cup Y5,-1)} \cup Y0,0 \cap Y0,-1 \cap Y0,-2 \cap Y0,-3 \cap Y0,-4 \cap Y0,-5$
$\cap \overline{(Y-1,0 \cup Y-1,-1 \cup Y-1,-2 \cup Y-1,-3 \cup Y-1,-4 \cup Y-1,-5)}$
$\cap \overline{(Y1,0 \cup Y1,-1 \cup Y1,-2 \cup Y1,-3 \cup Y1,-4 \cup Y1,-5)}$

FIG. 5B

$$P32 = Y0,0 \cap Y-5,0 \cap Y-4,0 \cap Y-3,0 \cap Y-2,0 \cap Y-1,0$$
$$\cap (Y-5,1 \cup Y-4,1 \cup Y-3,1 \cup Y-2,1 \cup Y-1,1 \cup Y0,1)$$
$$\cap (Y-5,-1 \cup Y-4,-1 \cup Y-3,-1 \cup Y-2,-1 \cup Y-1,-1 \cup Y0,-1)$$
$$\cup Y0,0 \cap Y0,5 \cap Y0,4 \cap Y0,3 \cap Y0,2 \cap Y0,1$$
$$\cap (Y-1,5 \cup Y-1,4 \cup Y-1,3 \cup Y-1,2 \cup Y-1,1 \cup Y-1,0)$$
$$\cap (Y1,5 \cup Y1,4 \cup Y1,3 \cup Y1,2 \cup Y1,1 \cup Y1,0)$$

$$P41 = Y0,0 \cap Y1,0 \cap Y2,0 \cap Y3,0 \cap Y4,0 \cap Y5,0 \cap Y6,0$$
$$\cap (Y0,1 \cup Y1,1 \cup Y2,1 \cup Y3,1 \cup Y4,1 \cup Y5,1 \cup Y6,1)$$
$$\cap (Y0,-1 \cup Y1,-1 \cup Y2,-1 \cup Y3,-1 \cup Y4,-1 \cup Y5,-1 \cup Y6,-1)$$
$$\cup Y0,0 \cap Y0,-1 \cap Y0,-2 \cap Y0,-3 \cap Y0,-4 \cap Y0,-5 \cap Y0,-6$$
$$\cap (Y-1,0 \cup Y-1,-1 \cup Y-1,-2 \cup Y-1,-3 \cup Y-1,-4 \cup Y-1,-5 \cup Y-1,-6)$$
$$\cap (Y1,0 \cup Y1,-1 \cup Y1,-2 \cup Y1,-3 \cup Y1,-4 \cup Y1,-5 \cup Y1,-6)$$

(NOTE) BA: ADP+(3*N−1)*Nx+1

FIG.8
| REDUCTION RATIO AND REFERENCE ORIGINAL PIXELS CORRESPONDING TO REDUCTION RATIO | FINE LINE PATTERNS FIG.10 THROUGH FIG.15 |
|---|---|
| REDUCTION RATIO = 1/2 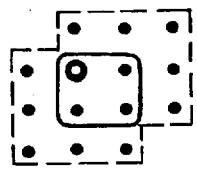 | P1 |
| REDUCTION RATIO = 1/3 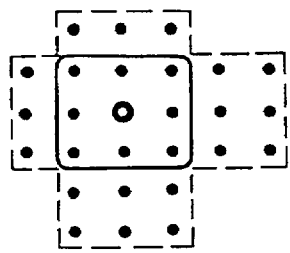 | P1, P2<br>P11 |
| REDUCTION RATIO = 1/4 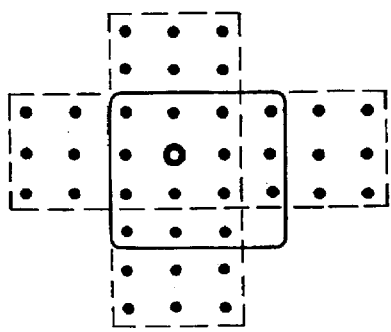 | P1, P2, P3<br>P11, P12<br>P21 |

FIG.9
| REDUCTION RATIO AND REFERENCE ORIGINAL PIXELS CORRESPONDING TO REDUCTION RATIO | FINE LINE PATTERNS FIG.10 THROUGH FIG.15 |
|---|---|
| REDUCTION RATIO = 1/5 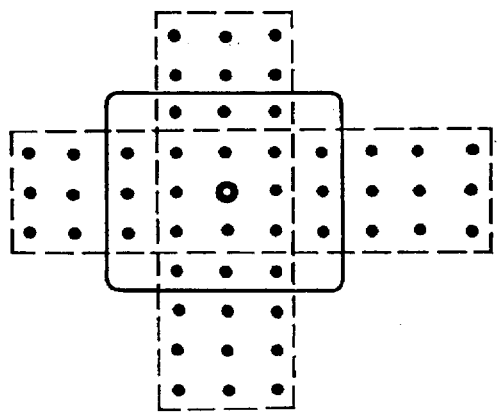 | P1,P2,P3,P4<br>P11,P12,P13<br>P21,P22<br>P31 |
| REDUCTION RATIO = 1/6 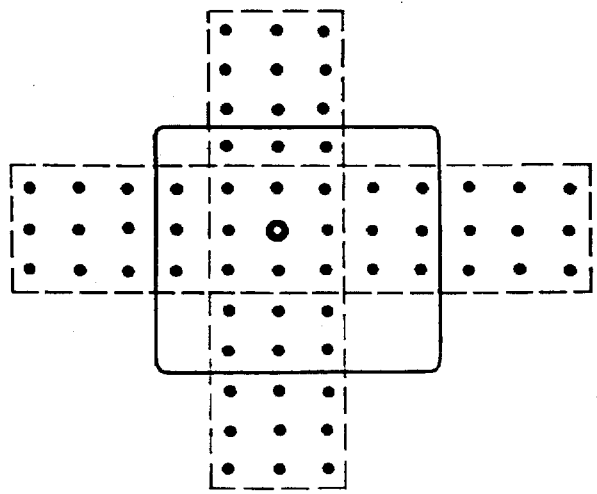 | P1,P2,P3,P4,P5<br>P11,P12,P13,P14<br>P21,P22,P23<br>P31,P32<br>P41 |

P1 (1/2)

P1 (2/2)

P2 (1/2)

P2 (2/2)

P3

P4

P5

P11(1/2)

P11(2/2)

P12(1/2)

P12(2/2)

P13

P14

P21(1/2)

P21(2/2)

P22(1/2)

P22(2/2)

P23

P31(1/2)

P31(2/2)

P32(1/2)

P32(2/2)

P41(1/2)

P41(2/2)

(O: ORIGINAL PIXELS ●: CENTER ORIGINAL PIXEL)

IMAGE REDUCTION CONVERSION METHOD

This application is a continuation of application Ser. No. 08/079,450, filed Jun. 21, 1993, now abandoned.

BACKGROUND OF THE INVENTION

The present invention relates to a high-speed binary-image processor and processing method for reduction conversion which carries out the high-speed reduction conversion of image data while suppressing degradation of the image quality of an image which is expressed using binary values (for example, black and white). In particular, the method and the process according to the present invention carries out the high-speed reduction conversion of image data while conserving the fine lines in the image.

Heretofore, such methods as the Selective Processing Conversion (SPC) method, wherein the value of the original pixel nearest the converted pixel is set to the value of the converted pixel (for details see Gyuubo and Kirihara: "An Investigation of Facsimile Linear Density Conversion", national meeting of IIEE (The Institute of Image Electronics Engineers of Japan), 10 (1975)), or the Region Discrimination method wherein four original pixels near the converted pixel are selected, the average density of these four pixels is calculated, and the value of the converted pixel is obtained by threshold processing (for details see Kubota and Arakawa: "Image Degree Conversion as Pre-processing for Character Recognition", Technical Report of IECE (The Institute of Electronics Communications Engineers of Japan), PRL 81–92 (1982-02), have been developed as methods for reducing and converting image data expressed using binary.

However, in the above mentioned reduction conversion methods, there was a problem in that the fine lines in the original image may disappear in the converted image. Namely, in the SPC method, when the fine lines in the original image are not close enough to the position of the converted pixel, then these fine lines are lost in the converted image. Likewise, in the aforementioned Region Discrimination method as well, when the value of the converted pixel obtained according to the above-stated procedure, which reflects the average value of the neighboring pixels, does not coincide with the value of the fine line, then these fine lines are lost in the converted image.

Using FIG. 7, an explanation will now be provided of an example where fine lines are lost in the SPC method. FIG. 7 shows an example where black fine lines in the vertical direction are lost. In this example, P11–P52 are original pixels, Q1 and Q2 are converted pixels, and the dashed line indicates the center line in the horizontal direction between the original pixels. In the original image, a black line composed of black pixels P31 and P32 is present in a white background consisting of white pixels P11, P21, P41, P51, P12, P22, P42 and P52. As a result of carrying out operations to determine the converted pixel, the values of Q1 and Q2 become identical to P22 and P42, namely, white, because they are the closest to Q1 and Q2, respectively. Because neither Q1 nor Q2 is associated with a black value, the black fine line is lost in the converted screen.

Next, again using FIG. 7, an explanation will be made of an example where the same fine line is lost in the Region Discrimination method. As shown in FIG. 7, in this example, of the four original pixels P21, P22, P31, and P32 surrounding the converted pixel Q1, there are two original pixels with white values and two original pixels with black values. It is necessary to prevent the loss of the respective fine line by assigning a black value to the converted pixel Q1 when P31 and P32 constitute a black fine line. However, the procedure will give a value exactly between the white value and the black value, and therefore the converted pixel Q1 can have either black or white value depending on the threshold processing.

FIG. 7 schematically represents how a fine black line in a white background disappears in a converted image when an original image is converted according to conventional reduction methods. It is readily understood from the above description that same problem can occur in a reduction conversion of fine white lines in a black background according to the conventional reduction conversion methods.

SUMMARY OF THE INVENTION

The present invention, therefore, was developed taking into consideration the problems encountered in the conventional art as described above, and has as its objective the provision of a binary-image reduction conversion method which suppresses the loss of fine lines from the converted image, and a device therefor.

According to a method of the present invention, when a fine line exists in the original image and the fine line is in the vicinity of the converted pixel, the converted pixel is given the value of the fine line. For example, when a white fine line exists near the converted pixel, a white value is given to the converted pixel even if the original pixels nearest to the converted pixel is black.

According to an aspect of the present invention, a high-speed binary-image reduction conversion method for reducing a binary visual image at a reduction ratio of 1/N (where N is an integer of 2 or larger) is provided, the method comprising the steps of:

detecting a fine line in a reference area, wherein said fine line is one of an aggregation of concordant pixels having a vertical length equal to L pixels or longer and a horizontal width non-zero and less than N pixels, and an aggregation of concordant pixels having a vertical length non-zero and less than N pixels and a horizontal width equal to L pixels or longer; and said reference area is a union of a first region and a second region excluding an original center pixel which is defined as nearest to a converted pixel, both regions having said original center pixel at the center thereof; said first region has a length of L original pixels (where L is an integer of 3 or more) in the vertical direction and a width of 2N pixels in the horizontal direction, and said second region has a width of L original pixels in the horizontal direction and a length of 2N original pixels in the vertical direction:

selecting from among said detected aggregations (this aggregation hereinafter referred to as "fine line"), only the aggregation wherein the centroid is present in the region consisting of a square of N×N pixels wherein the original center pixel is taken as the center; and setting the converted pixel to a value different from the value of the original center pixel if a fine line of a value different from that of the original center pixel is selected, and setting the converted pixel to the same value as the original center pixel if a fine line of a value different from that of the original center pixel is not selected.

According to another aspect of the present invention, a high-speed binary-image processor for reduction conversion is provided, the high-speed binary-image processor comprising:

a detecting means for detecting an aggregation of concordant pixels in a reference area, the aggregation having a vertical length which is equal to L pixels or longer and a horizontal width which is non-zero and less than N pixels, and an aggregation of concordant pixels having a vertical length which is non-zero and less than N pixels and a horizontal width which is equal to L pixels or longer;

a selecting means for selecting from among the detected aggregations, only the aggregation wherein the centroid is present in the region consisting of a square of N×N pixels wherein the converted pixel is taken as the center; and a setting means for setting the converted pixel to a value different from the value of the center pixel if a fine line of a value different from that of the original center pixel was selected within the aforementioned limits, and setting the value of the converted pixel to the same value as the original center pixel if a fine line of a value different from that of the original center pixel was not selected within the aforementioned limit.

BRIEF EXPLANATION OF THE DRAWINGS

FIGS. 4A and 4B are the logic formulae of circuit 44 of the reduction operator shown in FIG. 2.

FIGS. 5A and 5B are the logic formulae of circuit 44 of the reduction operator shown in FIG. 2.

FIG. 8 shows the relationship between the reduction ratio and the reference area consisting of the reference original pixels.

FIG. 9 shows the relationship between the reduction ratio and the reference area consisting of reference original pixels.

FIG. 17 shows the addressing of the pixels for defining a fine line.

DETAILED DESCRIPTION OF THE PRESENT INVENTION

Figure 1:
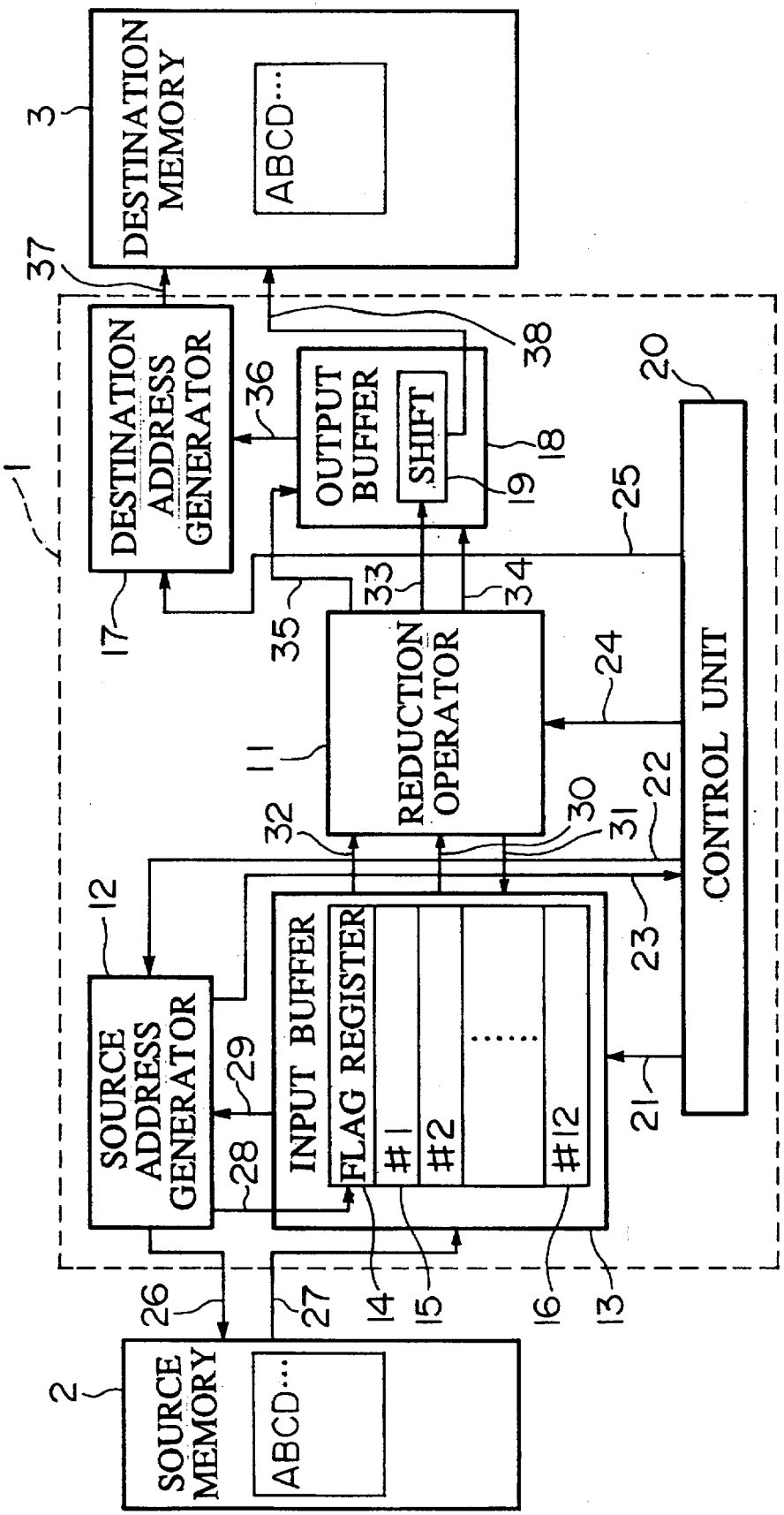
FIG. 1 is a schematic diagram of an embodiment of a high-speed binary image processor for reduction conversion according to the present invention.

Before preceding to an explanation of the embodiments of the present invention, a general explanation relating to reduction conversion as employed in the present invention will first be made.

I. Definitions (1) Fine line:

a vertical or diagonal aggregation of concordant pixels wherein the length in the vertical direction is comprised of a continuation of L or more pixels and the width in the horizontal direction is (N-1) pixels or less, or a horizontal or diagonal pixel aggregation wherein the length in the horizontal direction is L or more continuous pixels and the width in the vertical direction is (N-1) pixels or less Below, the definition for fine lines where the line width is the (W-1) pixel portions (where white is set to 1, black is set to 0) is shown.

Conditions for detecting white fine lines is expressed as follows.

$$FW = \overline{V_{0,0}} \cap \overline{V_{1,0}} \cap \ldots \cap \overline{V_{W-1,0}} \cap \overline{V_{W,0}}$$

$$\cap (V_{0,1} \cup V_{1,1} \cup \ldots \cup V_{W-1,1} \cup V_{W,1})$$

$$\cap (V_{0,-1} \cup V_{1,-1} \cup \ldots \cup V_{W-1,-1} \cup V_{W,-1})$$

Conditions for detecting black fine lines is expressed as follows.

$$FB = V_{0,0} \cap V_{1,0} \cap \ldots \cap V_{W-1,0} \cap V_{W,0}$$

$$\cap (\overline{V_{0,1}} \cup \overline{V_{1,1}} \cup \ldots \cup \overline{V_{W-1,1}} \cup \overline{V_{W,1}})$$

$$\cap (\overline{V_{0,-1}} \cup \overline{V_{1,-1}} \cup \ldots \cup \overline{V_{W-1,-1}} \cup \overline{V_{W,-1}})$$

In the above equations:

"$V_{x,y}$" indicates the value of $Q_{x,y}$ shown in FIG. 17,

"—" indicates the logical NOT

"$\cap$" indicates the logical "AND"

"$\cup$" indicates the logical "OR"

(2) Original center pixel:

the original pixel which is the shortest distance from the converted pixel

II. Original Pixel for Comparison

Setting the center of the original pixels as the center point, a comparison is made of the pixels for which the vertical width is L (L is an integer equal to or larger than 3) pixels and the horizontal length is 2N pixels in the horizontal direction, and the horizontal width is L pixels and the vertical length is 2N pixels in the vertical direction. FIGS. 8 and 9 show the relationship between the reduction rate (here examples are made for reduction ratios of ½ through ⅙) and the original pixels for reference (broken line). In the figures, the double circle indicates the original center pixel. When the reduction rate is ½, for example, then the aforementioned 2N becomes 4.

III. Fine Line Selection Conditions

The detected fine line must fulfill the following conditions so that the value of the fine lines is reflected to the converted pixel.

1) The original center pixel is not a portion of a fine line (namely, only lines or surfaces where the width is N pixels or more are detected).

2) The position of the centroid of the fine line (the center point of the fine line present on a horizontal or vertical line which passes through the original center pixel) is present on or within the solid line shown in FIGS. 8 and 9 (namely, only the value of the fine line for the converted pixel the shortest distance from the fine line is effected).

FIGS. 8 and 9 show fine line pattern combinations which satisfy the fine line selection conditions. Further, FIGS. 10A–10D, 11A–11C, 12A–12F, 13A–13E, 14A–14D, and 15A and 15B show respective fine line patterns (the case for black fine lines). Additionally, we note here that in FIGS. 10A–10D, 11A–11C, 12A–12F, 13A–13E, 14A–14D, and 15A and 15B:

(i) the double circle indicates the original center pixel
 (ii) a white circle indicates a white original pixel
 (iii) a black circle indicates a black original pixel
 (iv) a half white, and half black circle indicates either a white or black original pixel (however, this requires that at least one of the adjacent pixels is a black original pixel)

Further, FIGS. 10A–10D and 11A–11C correspond to a one pixel line width pattern; FIGS. 12A–12F corresponds to a two pixel line width pattern; FIGS. 13A–13E corresponds to a three pixel line width pattern; FIG. 14A–14D corresponds to a four pixel line width pattern; and FIGS. 15A and 15B corresponds to a five pixel line width pattern.

As shown in FIG. 8, when the reduction ratio is set to ½, pattern P1 is employed as the fine line pattern assortment. This pattern P1, however, employs the pattern P1(½) and the pattern P1(⅔) shown in FIG. 10 at a position where the original center pixels, shown by as double circle, are superimposed.

IV. Reduction Operation Method

The reduction operation method is shown below.

Process (1): Determine the value of the original pixel (the original center pixel) which is the shortest distance from the converted pixel.

Process (2): Search for white fine lines and black fine lines, and select the line of which the centroid is the closest to the converted pixel.

Process (3): If no white or black fine lines are selected in (2), make the value of the converted pixel the value determined in (1).

Process (4): If a white or black fine line is detected in (2), make the value of the converted pixel the value of the detected fine line.

Process (5):

When both a white fine line and a black fine line are detected in process (2), the value different from the value determined in (1) is set to the value of the converted pixel. Here, the reduction operation method may be represented by the following Table 1.

TABLE 1

The Relationship between Fine Lines and Converted Pixels

| center original pixel fine line selection | White | Black |
|---|---|---|
| none | White | Black |
| white fine lines only | White | |
| black fine lines only | Black | |
| white fine lines and black fine lines | Black | White |

From the above table, the following may be observed.

If the original center pixel is white (black), then an operation for detecting and selecting the black (white) fine lines is carried out. If a black (white) fine line is detected and selected, then the converted pixel is set to black (white), while if a black (white) line cannot be detected and selected, then the converted pixel is set to the same value as the original center pixel. By this means, it is possible to obtain the desired converted pixel value.

Figure 16:
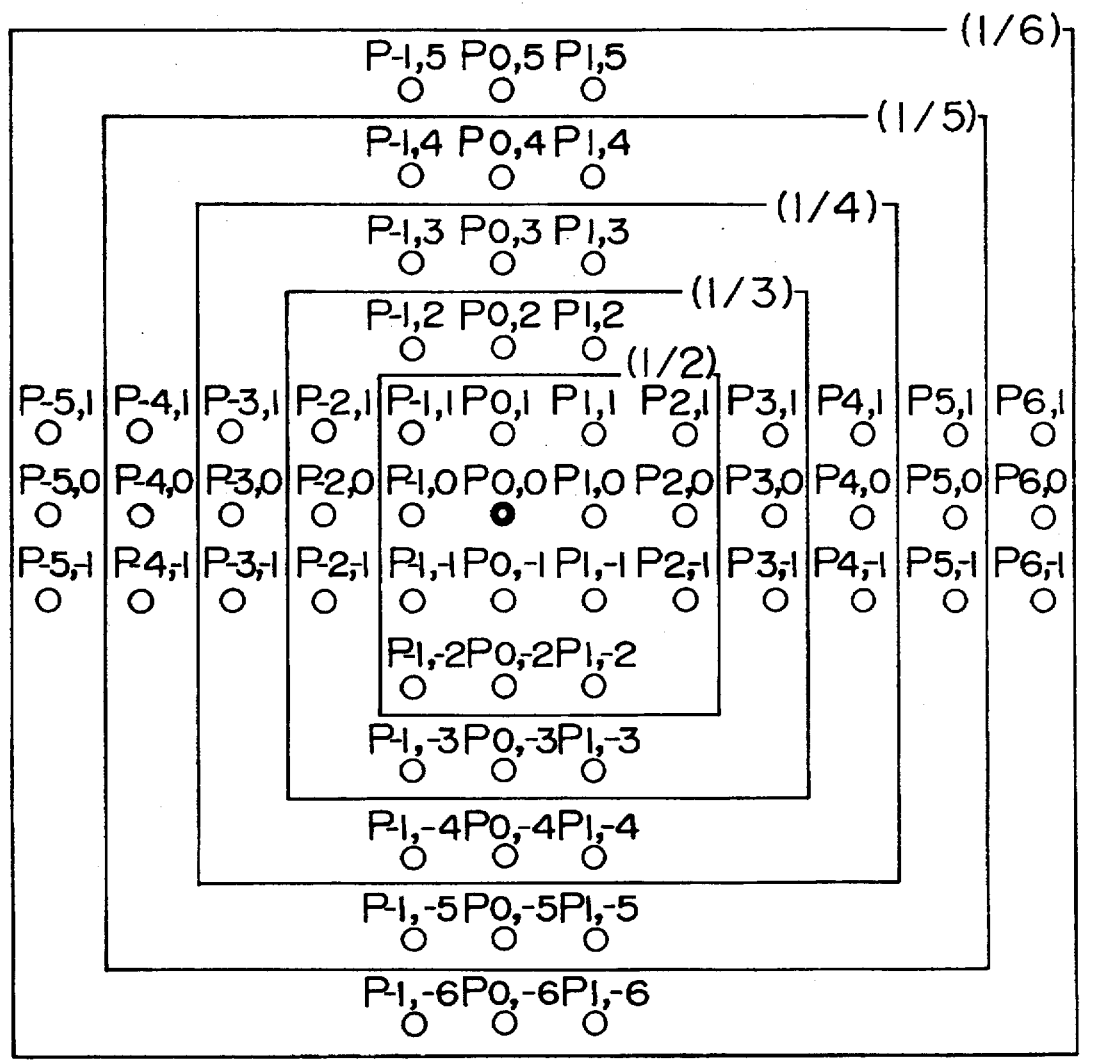
FIG. 16 shows the addresses of the original pixels at a reduction ratio.

The algorithm for obtaining the value (FN) of the converted pixel may be expressed by means of logic formula as shown below. The addresses of the original pixels are shown in FIG. 16.

if $(V_{0,0} = 0)$ $$V_{x,y} = \overline{V_{x,y}};$$

else $$V_{x,y} = V_{x,y};$$

$$F1(n) = V_{n,0} \cap \left( \bigcup_{x=n+1}^{N-n-1} V_{x,0} \right) \cap V_{N-n,0} \cap \left( \bigcup_{x=n}^{N-n} V_{x,1} \right)$$
$$\cap \left( \bigcup_{x=n}^{N-n} V_{x,-1} \right) \cup V_{0,-n} \cap \left( \bigcup_{y=n+1}^{N-n-1} V_{0,-y} \right)$$
$$\cap V_{0,n-N} \cap \left( \bigcup_{y=n}^{N-n} V_{-1,-y} \right) \cap \left( \bigcup_{y=n}^{N-n} V_{1,-y} \right);$$

$$\overline{F2(n)} = V_{-n,0} \cap \left( \bigcup_{x=n+1}^{N-n-2} V_{-x,0} \right) \cap V_{n+1-N,0} \cap \left( \bigcup_{x=n}^{N-n-1} V_{-x,1} \right)$$
$$\cap \left( \bigcup_{x=n}^{N-n-1} V_{-x,-1} \right) \cup V_{0,n} \cap \left( \bigcup_{y=n+1}^{N-n-2} V_{0,y} \right)$$
$$\cap V_{0,N-n-1} \cap \left( \bigcup_{y=n}^{N-n-1} V_{-1,y} \right) \cap \left( \bigcup_{y=n}^{N-n-1} V_{1,y} \right);$$

$p1 = [(N-2)/2]; p2 = [(N-3)/2];$ $$F_{BW} = \left( \bigcup_{n=0}^{p1} F1(n) \right) \cup \left( \bigcup_{n=0}^{p2} F2(n) \right);$$

$F_N = V0,0 \ (+) \ F_{BW};$

Where:

Vx,y: value of Px,y

N: value when the reduction ratio is expressed as 1/N

¯: logical NOT

∩: logical AND

∪: logical OR (+): logical EOR $$\bigcup_{x=0}^{n} V_{x,0} : V_{0,0} \cup V_{1,0} \cup \ldots \cup V_{n-1,0} \cup V_{n,0}$$

[n]: Maximum integer not exceeding N $$\bigcup_{n=0}^{p} F(n): F(0) \cup F(1) \cup \ldots \cup F(p-1) \cup F(p)$$

however,

-continued $$\bigcup_{n=0}^{-1} F(n) = 0$$

V. Scanning Interval for Original Pixels

At a reduction ratio of 1/N, N pixels units are scanned in the horizontal direction. Namely, each set of N pixels is scanned and each set of N lines in the vertical direction is scanned.

An explanation will now be made of the present invention based on the figures.

FIG. 1 shows the structure of an embodiment of the present invention. The numeral 1 indicates a high-speed binary-image processor for reduction conversion; 2 is a source memory; and 3 is a destination memory. The high-speed binary-image reduction conversion processor 1 shown in the figure has a reduction operator 11, a source address generator 12, an input buffer 13, a destination address generator 17, an output buffer 18 and a controller 20 which exercises control over the preceding parts. Further, input buffer 13 consists of a flag register 14 (of the same structure as the data buffer of the input buffer 13) which holds a flag which indicates the setting of the final image data in the horizontal direction in the data buffer of the input buffer; and shift registers 15 through 16, which hold image data of the source memory address generated by the source address generator 12. Output buffer 18 consists of serial conversion buffers which converts reduced one bit image data from the reduction operator 11 to one byte image data.

Reduction operator 11 outputs a data transfer request strobe signal to signal line 31; outputs reduction operated 1 bit image data to data line 33; outputs a strobe signal synchronized to the image data of data line 33, to signal line 34; and outputs an ON signal when the 1 bit image data output to data line 33 is the last data in the horizontal direction with respect to signal line 35.

Source address generator 12 outputs an ON signal to signal line 23 when transfer of the image data corresponding to 1 page has been completed; outputs a source memory 2 address wherein the image data to be reduced is stored, to address line 26; and outputs an ON signal when the image data transferred to the input buffer is the last in the horizontal direction with respect to signal line 28.

Input buffer 13 outputs a data transfer request when the data buffer of the input buffer is empty, to signal line 29; outputs the image data of shift registers 15 through 16 synchronized to signal line 31, to data line 30; and outputs an ON signal to signal line 32 when the image data of data line 30 is the last in the horizontal direction.

Destination address generator 17 outputs the address of the destination memory 3 which stores the reduction operated image data, to address line 37.

If 1 byte data is stored in shift register 19, output buffer 18 sets signal line 36 to ON and outputs the 1 byte (serial) image data to data line 38.

Controller 20 outputs the reduction ratio to signal line 21; outputs the reduction ratio, the first address of the source memory 2 where the aforementioned data is stored, the size in the horizontal direction of the image data, and the size in the vertical direction of the image data, to signal line 22; outputs the reduction ratio to signal line 24; and outputs the first address of the destination memory 3 which stores the reduction operated image data, to the signal line 25.

Data line 27 outputs the image data of the address of source memory 2 indicated by address line 26.

Figure 2:
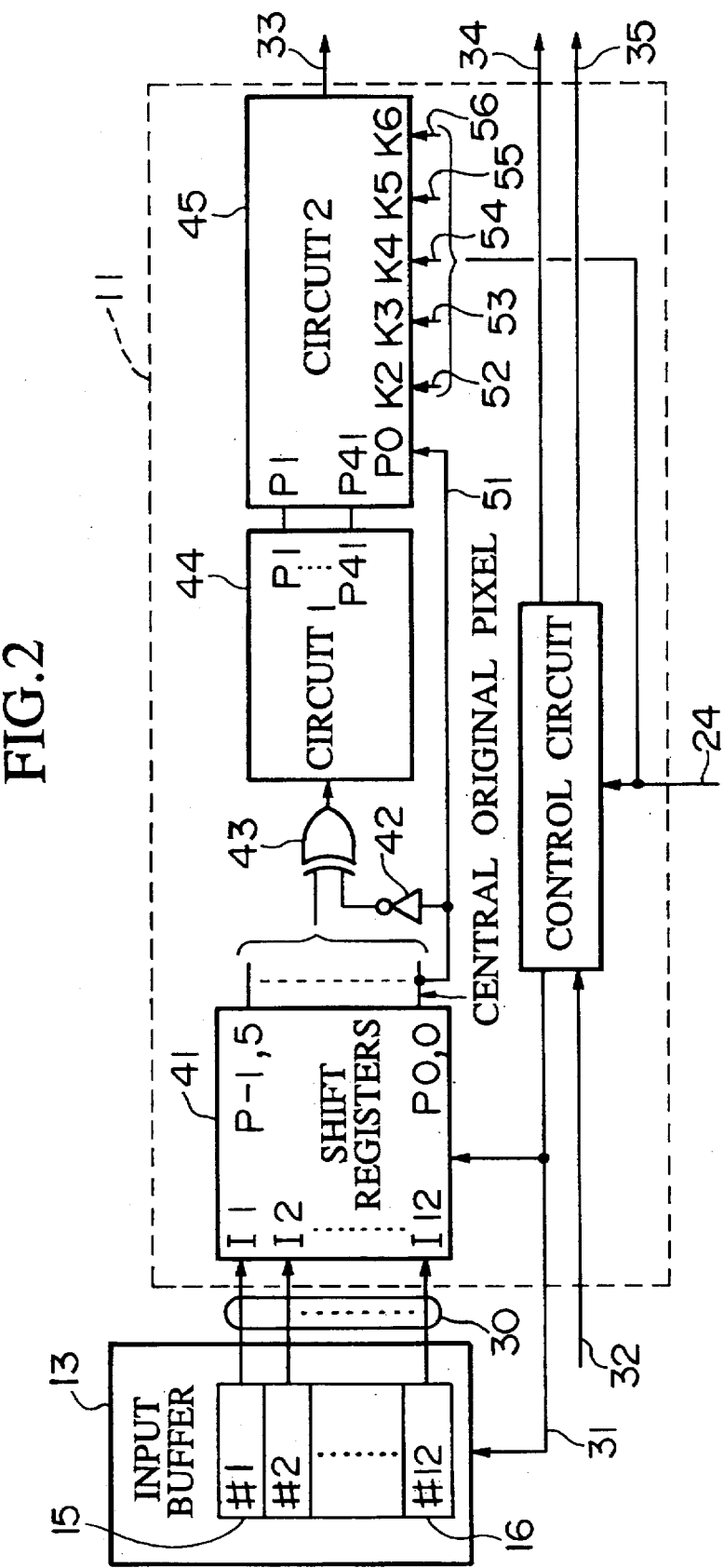
FIG. 2 is a schematic diagram of the reduction operator of the high-speed binary image processor for reduction conversion shown in FIG. 1.

FIG. 2 is a block diagram of the reduction operator 11 of FIG. 1.

Figure 3:
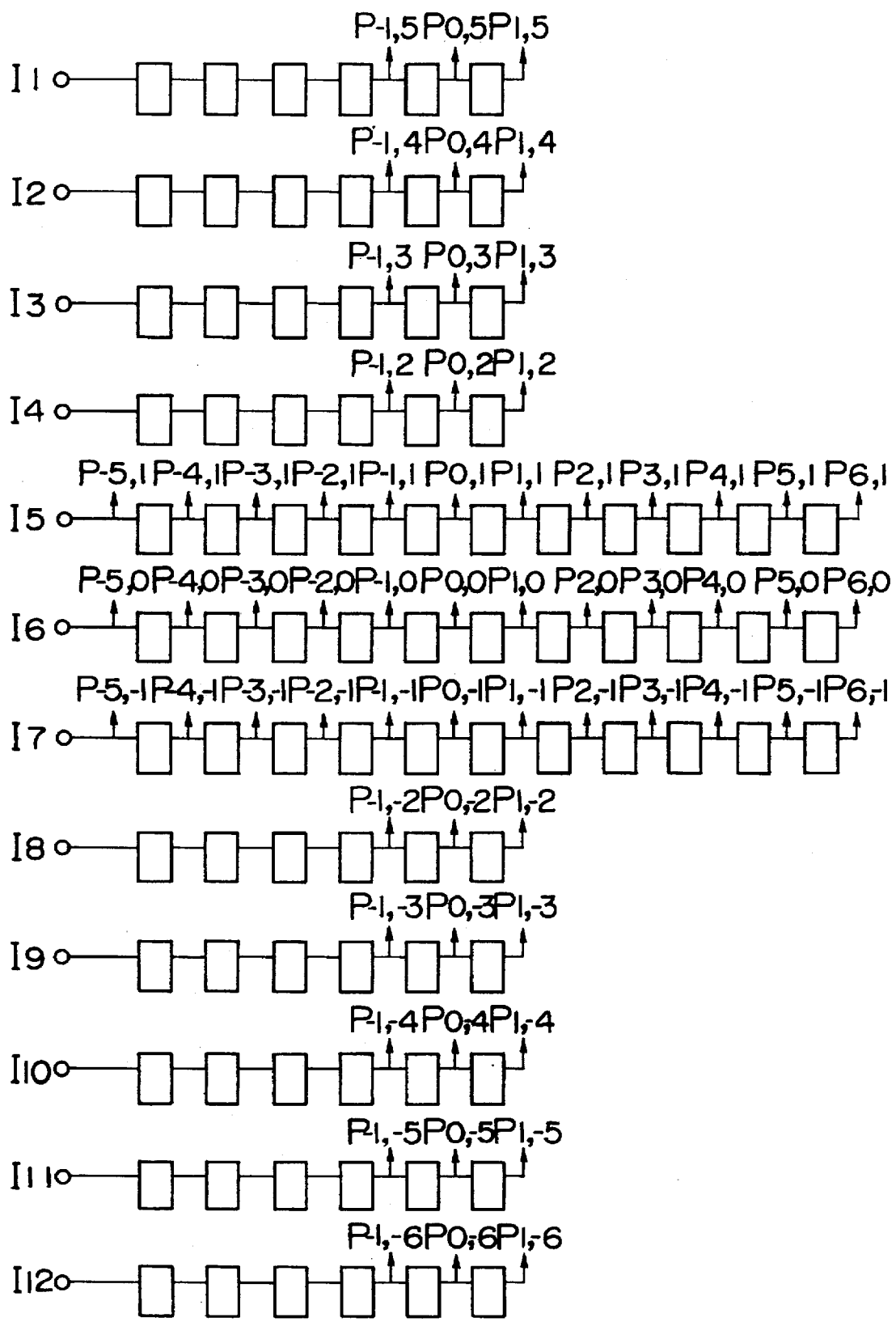
FIG. 3 is a schematic diagram of the shift registers of the reduction operator shown in FIG. 2.

The numeral 41 is a group of shift registers in which the output of shift registers 15 (#1) through 16 (#12) of the input buffer 13 is input to I1 through I12, and which output P-1,5 to P1,6 by means of the shift register structures shown in FIG. 3. The rectangular boxes shown in FIG. 3 indicate flip-flop. The shift register structure shown in FIG. 3 right-shifts the input of I1 to I12 in synchronization with the strobe signal of signal line 31.

The numeral 42 is an inverter for switching the polarity of the output $P_{0,0}$ from the shift registers 41. Further, 43 is a plurality of exclusion alteration gates (EOR) which outputs the polarity of the entire output from shift registers 41 as is, when the value of the output $P_{0,0}$ from shift registers 41 is 1, and which change over the polarity of the entire output from the shift registers 41 when the value of the output $P_{0,0}$ is 0.

The numeral 44 is a logic circuit of 15 varieties (P1 to P41) combining all the pattern combinations from line width=1 pixel to line width=5 pixels. This logic formula is shown in FIGS. 4 and 5. The $P_{x,y}$ of the output of shift registers 41 in FIGS. 4 and 5 correspond to the $Y_{x,y}$ of the output of EOR gate 43.

The numeral 45 is a logic circuit which carries out the selection of the pattern which corresponds to the reduction ratio indicated by all the pattern combinations from logic circuit 44, and indicates the polarity of the output. The signal line 51 ($P_o$) to this circuit is the output $P_{0,0}$ of shift registers 41. When the indicated reduction ratio is ½, signal line 52 (N2) becomes 1. When the indicated reduction ratio is ⅓, signal line 53 (N3) becomes 1. When the indicated reduction ratio is ¼, signal line 54 (N4) becomes 1. When the indicated reduction ratio is ⅕, signal line 55 (N5) becomes 1. When the indicated reduction ratio is ⅙, signal line 56 (N6) becomes 1. The logic formula of circuit 45 is as shown below.

$FN = PO (+)$ $\{P1 \cap (N2 \cup N3 \cup N4 \cup N5 \cup N6)$ $\cup (P2 \cup P11) \cap (N3 \cup N4 \cup N5 \cup N6)$ $\cup (P3 \cup P12 \cup P21) \cap (N4 \cup N5 \cup N6)$ $\cup (P4 \cup P13 \cup P22 \cup P31) \cap (N5 \cup N6)$ $\cup (P5 \cup P14 \cup P23 \cup P32 \cup P41) \cap N6\}$ Next, the operation of the present invention will be explained.

The operation of the source address generator 12, the input buffer 13, the reduction operator 11, the destination address generator 17 and the output buffer 18, in FIG. 1 will be explained for the case where the high-speed binary-image reduction conversion processor 1 reads the image data (first address: AS, horizontal direction: Mx bytes, vertical direction: My lines) stored in source memory 2, a reduction operation wherein the reduction ratio of 1/N is performed, and the image data is stored in destination memory 3 (first address: AD).

(1) Operation of Source Address Generator

Figure 6:
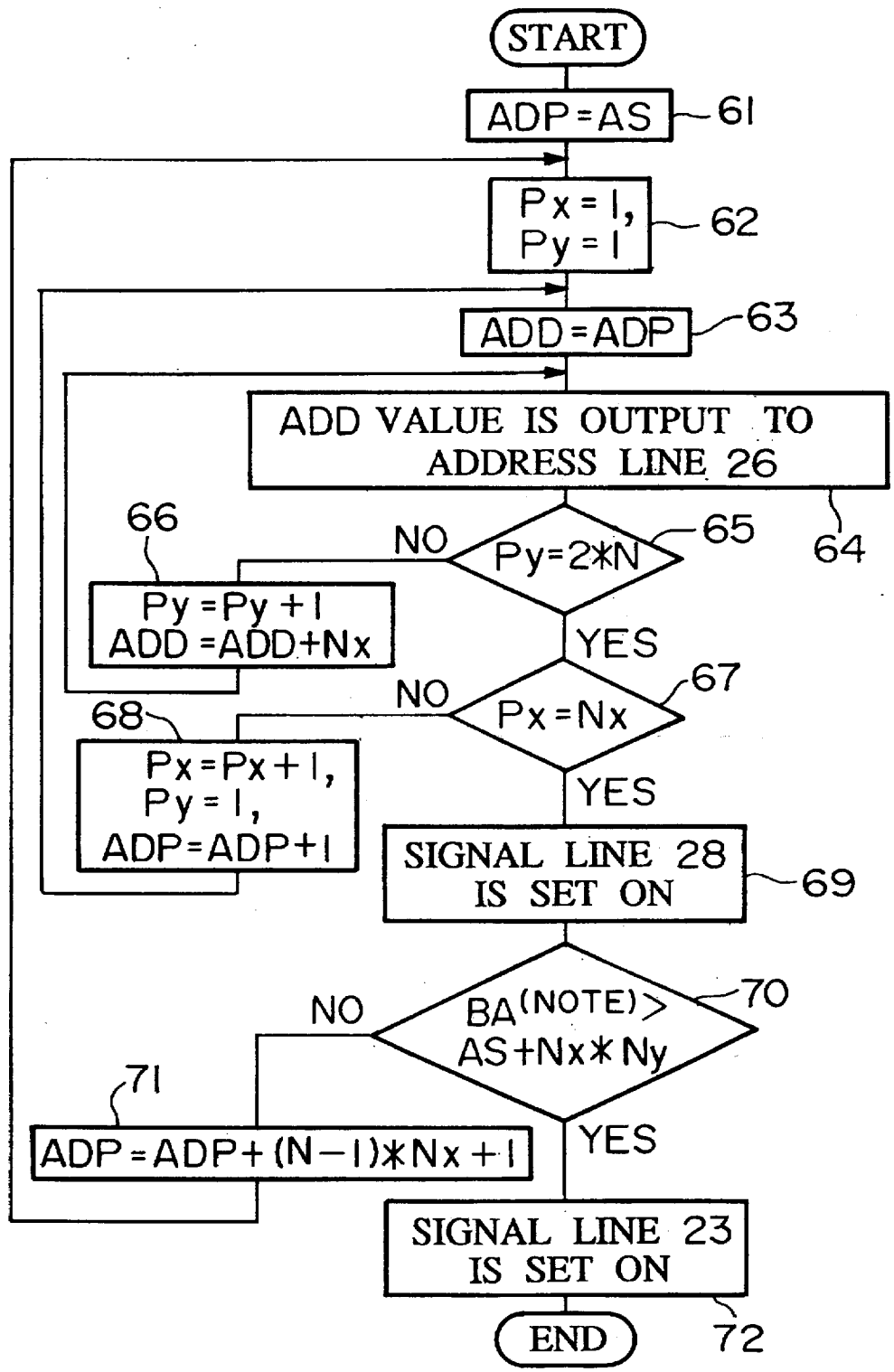
FIG. 6 is the operation flow chart of the source address generator of the high-speed binary image processor for reduction conversion shown in FIG. 1.
Figure 7:
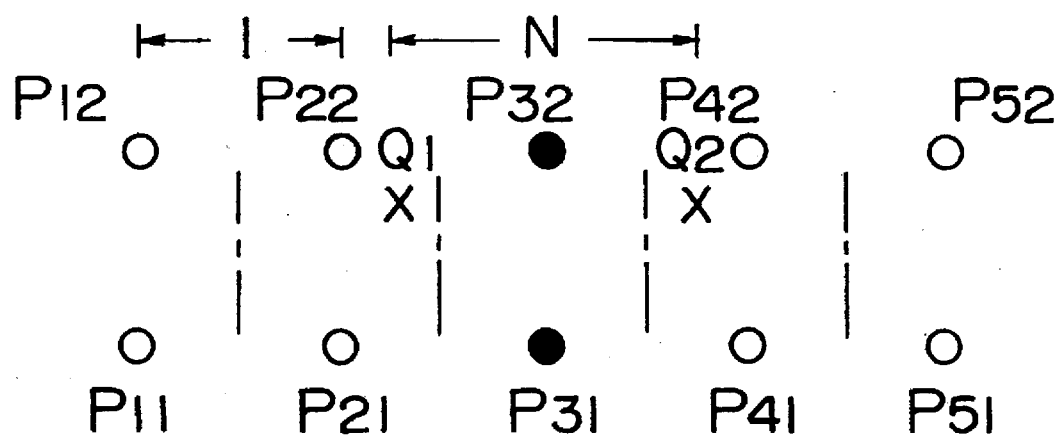
FIG. 7 shows an example of a situation where fine lines are lost in the conventional art.
Figure 10A:
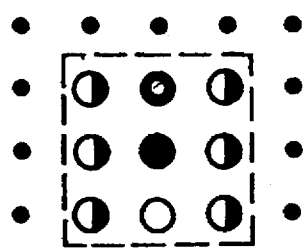
FIG. 10A–10D shows the total black fine line pattern assortment at a reduction ratio.
Figure 10B:
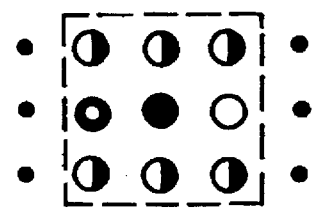
Figure 10C:
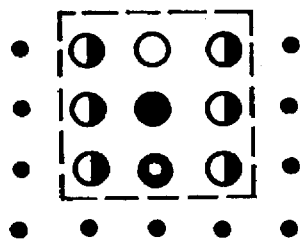
Figure 10D:
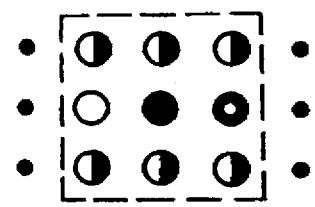
Figure 11A:
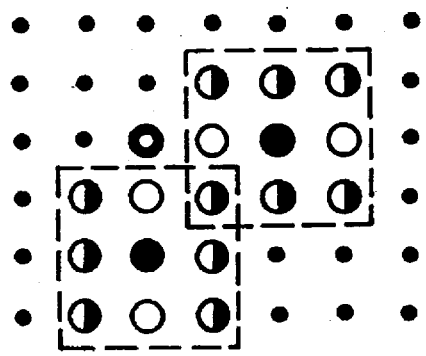
FIG. 11A–11C shows the total black fine line pattern assortment at a reduction ratio.
Figure 11B:
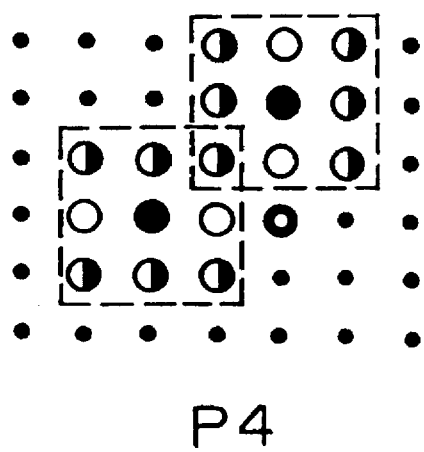
Figure 11C:
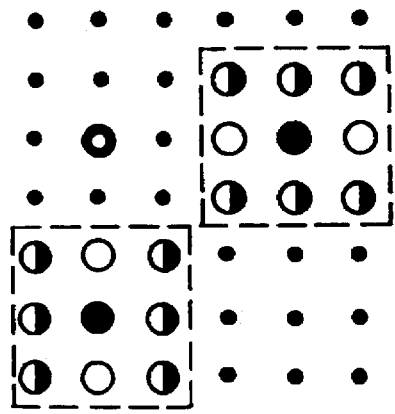
Figure 12A:
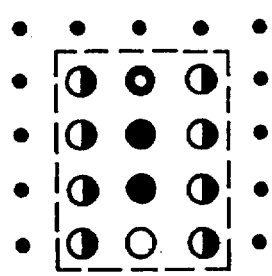
FIG. 12A–12F shows the total black fine line pattern assortment at a reduction ratio.
Figure 12B:
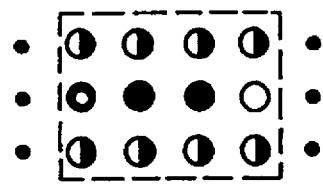
Figure 12C:
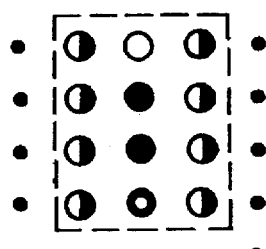
Figure 12D:
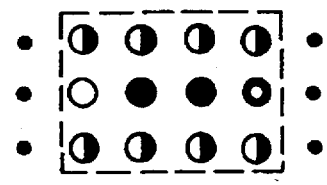
Figure 12E:
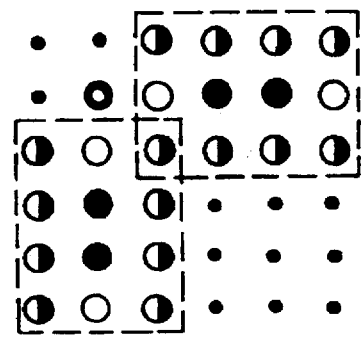
Figure 12F:
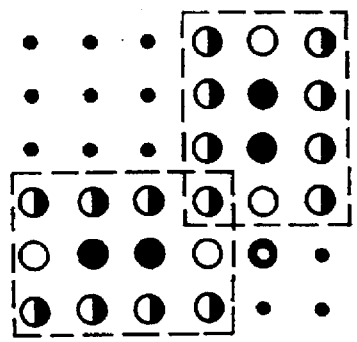
Figure 13A:
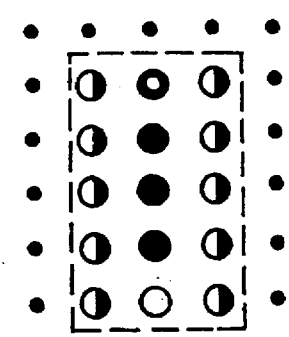
FIG. 13A–13E shows the total black fine line pattern assortment at a reduction ratio.
Figure 13B:
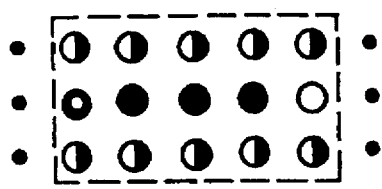
Figure 13C:
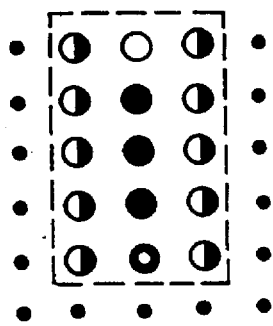
Figure 13D:
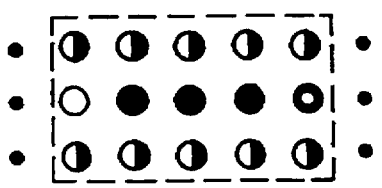
Figure 13E:
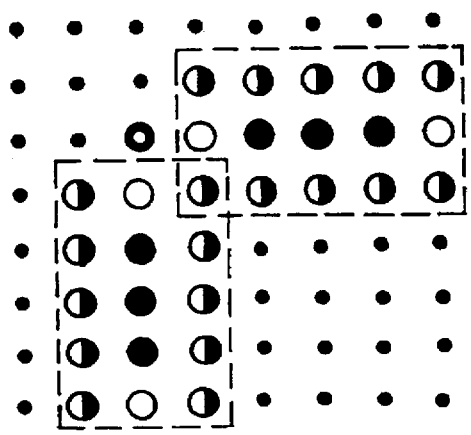
Figure 14A:
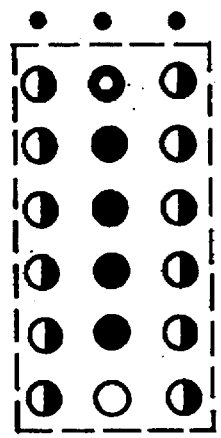
FIG. 14A–14D shows the total black fine line pattern assortment at a reduction ratio.
Figure 14B:
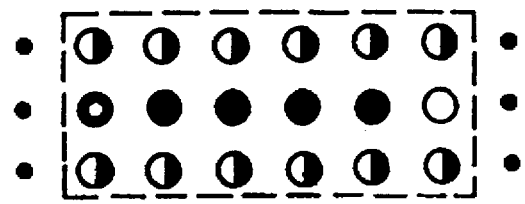
Figure 14C:
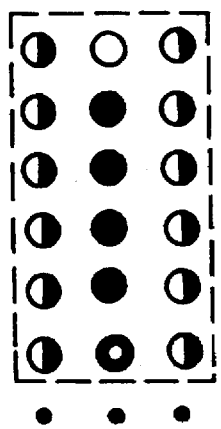
Figure 14D:
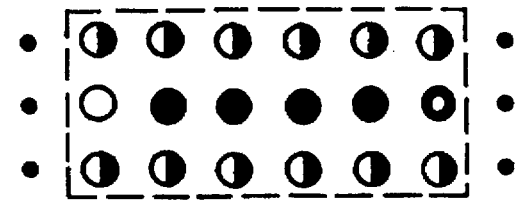
Figure 15A:
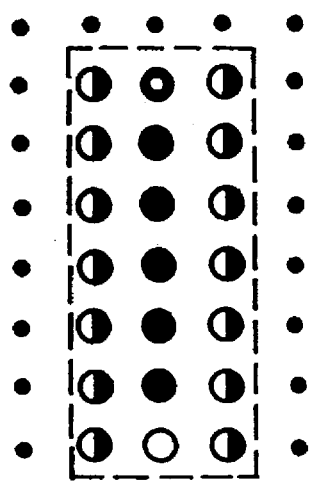
FIG. 15A and 15B shows the total black fine line pattern assortment at a reduction ratio.
Figure 15B:
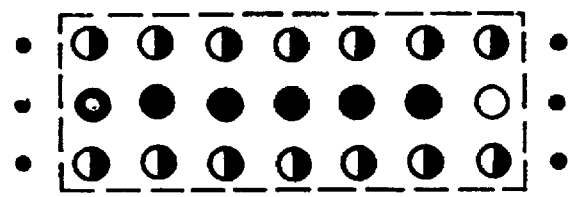

A flow chart showing the operation of the source address generator is shown in FIG. 6. Using FIG. 6, the operation of the source address generator will now be explained.

In 61, ADP holds the first address (AS) of a group of image data (the 2 times of bytes of the reduction ratio) to be transferred to the register of the input buffer 13 from the source memory 2. (Hereinafter, a "group of image data" will be referred to as "block data").

In 62, Px indicates the order from the top position of the block data, and Py indicates the order from the horizontal direction of the block data. Px and Py are set to initial values.

In 63, the value of the ADP is set with respect to the ADD output to address line 26.

In 64, the value of the ADD is output to address line 26, while the strobe signal of the signal line 31 is output.

In 65, a judgment is rendered as to whether or not the transferred data is the last of the block data.

In 66, Py is increased by +1 when it is determined in 66 that the transferred data is not the last of the block data, and ADD is increased by Mx (the address is increased by 1 in the vertical direction).

In 67, a judgment is rendered as to whether or not the block data is the last in the horizontal direction.

In 68, Px is increased by +1 when it is determined in 67 that the block data is not the last in the horizontal direction, Py is set to 1 (the highest position of the block data), and ADP is increased by +1 (the address is increased by 1 in the horizontal direction).

In 69, the signal line 28 is set to ON because the block data is the last in the horizontal direction.

In 70, a decision is rendered on whether or not the block data to be transferred next to the register of the input buffer 13 is present in a byte amount two times greater (complete block data) than the reduction ratio.

In 71, the address from the current line to the left end of the bottom of line N is set in ADP due to the presence of block data according to 70.

In 72, signal line 23 is set to ON because the transfer of all the image data corresponding to one page has been completed according to 70.

(2) Operation of the Input Buffer

The block data for the address of the source memory 2 generated by the source address generator 12 is set in the register as shown in Table 2 in accordance with the indicated reduction ratio (1/N).

TABLE 2

| Reduction Ratio | Register Order for Setting Block Data |
|---|---|
| 1/2 | 5→6→7→8 |
| 1/3 | 4→5→6→7→8→9 |
| 1/4 | 3→4→5→6→7→8→9→10 |
| 1/5 | 2→3→4→5→6→7→8→9→10→11 |
| 1/6 | 1→2→3→4→5→6→7→8→9→10→11→12 |

The set program data is synchronized to the strobe signal of the signal line 31, shifted and output from data line 30. Further, flag signal 14 is also synchronized to the strobe signal, shifted and output from signal line 32.

Further, if the data buffer is empty, signal line 29 is set to ON, and a request for data transfer is made to source address generator 12.

(3) Operation of the Reduction Operator

The reduction operator is shown in detail in FIG. 3. The output of the input buffer 13 is input to I1 through I12 of shift registers 41.

When the image data input from I1 to I12 is a pixel of the leftmost end which forms an image, control circuit 46 shifts the shift register of the shift registers and the shift register of input buffer 13 by outputting (N+5) strobe signals to signal line 31, in order to match the position of the reference pixel. Meanwhile, the (N+5)th strobe signal is output to signal line 31 and, after a short delay, a strobe signal is output to signal line 34.

Further, when the image data input to shift registers 41 is not a pixel of the leftmost end which forms an image, N strobe signals are output to signal line 31. Meanwhile, the Nth strobe signal is output to signal line 31 and, after a short delay, a strobe signal is output to the signal line 34 (a summation of the processing times for shift registers 41, EOR gate 43, circuit 44, and circuit 45).

The bit order of the image data input to shift registers 41 is input in order from the leftmost end which forms an image.

When signal line 32 is ON (when the input image data is the final in the horizontal direction), control circuit 46 sets signal line 35 to ON after a slight delay.

(4) Operation of the Destination Address Generator

If signal line 36 is ON (when 1 byte data is stored in shift register 19 of output buffer 18), the set first address of the destination memory 3 is output to address line 37. After this, each time signal line 36 comes ON, the address is increased by +1 and output to address line 37.

(5) Operation of the Output Buffer

The reduced 1 bit image data input from data line 33 is stored in shift register 19 by means of the strobe signal of signal line 34.

Further, if signal line 35 is ON (when the image data is the last data in the horizontal direction) before the 1 byte image date is stored in shift register 19, "0" of "1" is stored in the portion of the shift register 19 which is not storing image data, creating a condition wherein data of 1 byte is stored.

If 1 byte data is stored in shift register 19, then signal line 36 is set to ON and 1 byte (serial) image data is output to data line 38.

As explained in detail above, the main effects of the present invention are summerized as follows:

The high-speed reduction conversion of image data wherein the degradation of the image quality of an image expressed in binary (for example, black and white) can be suppressed (and in particular, fine lines can be preserved) can be realized with a device of a simple structure.

Because the reduction conversion algorithm applied in the present invention is a general one, its application is possible even if the reduction ratio is optional.

Because the reduction conversion algorithm employed in the present invention converts white fine lines and black fine lines equally, blotting or blurring does not readily occur.

Because the reduction conversion algorithm employed in the present invention is for hard ware, it can be easily realized with LSI or the like, and thus it is possible to realize a high function binary-image processor for reduction conversion for a low price.

Because the source memory address generator and the destination memory address generator can operate independently, high performance can be realized by means of a simple structure.

In the above explanation, reduction ratios of ½ through ⅙ where used. However, the device and method of the present invention may be used for reduction ratios other than these.

Furthermore, in the above explanation, a fine line was defined as a continuous line of 3 or more pixels in the original image. However, the device and method of the present invention may be suitably applied to situations wherein a fine line is defined as a continuous line of 3, 4, 5 or more pixels.

What is claimed is:

1. A computer-implemented image data reduction and image conversion method for an image consisting of a plurality of pixels, at a reduction ratio of 1/N, wherein N is a positive integer greater than or equal to 2, the computer-implemented image data reduction and image conversion method comprising the steps of:

determining values for the shortest distance from a center pixel to each of the other pixels in an image to be converted;

detecting in the image a first aggregation of pixels or a second aggregation of pixels in a reference area of the image, wherein said first aggregation has a vertical length equal to or greater than L pixels and a horizontal width less than N pixels, wherein L is an integer greater than or equal to 3, and said second aggregation has a vertical length less than N pixels and a horizontal width equal to or greater than L pixels, wherein said reference area includes pixels surrounding said center pixel;

setting a value for each pixel in said image as at least one of (1) a pixel value of the determined value of the shortest distance from each pixel to said center pixel if no first aggregation of pixels has been detected, (2) a value of said detected first aggregation of pixels if the first aggregation of pixels has been detected, and (3) a value different from the value of the shortest distance from each pixel to said center pixel if both the first aggregation of pixels and the second aggregation of pixels have been detected; and storing in a storage medium the reduced image data representing a converted image.

2. The computer-implemented image data reduction and image conversion method according to claim 1, wherein said center pixel is not a portion of said first or second aggregation and a centroid of said first or second aggregation is a region consisting of a square of N×N pixels centered at said center pixel.

3. The computer-implemented image data reduction and image conversion method according to claim 2, wherein said reference area is a union of a first region and a second region excluding said center pixel, said first region having a length of L pixels in the vertical direction and a width of 2N pixels in the horizontal direction, and said second region having a width of L pixels in the horizontal direction and a length of 2N pixels in the vertical direction.

4. The computer-implemented image data reduction and image conversion method according to claim 1, further including the step of:

reading out the stored reduced image data for display of the converted image.

5. A computer-implemented image data reduction and image conversion method for a black and white image consisting of a plurality of original pixels, each original pixel being either black or white, said data reduction and image conversion performed at a reduction ratio of 1/N, N being a positive integer greater than 1, the computer-implemented image data reduction and image conversion method comprising the steps of:

determining a value for a shortest average distance from a center pixel to the original pixels consisting of the image to be converted;

defining a reference area around the original center pixel;

determining whether a first kind of aggregation of pixels exists in the reference area, said first kind of aggregation being an assembly of either black or white pixels covering an area having a vertical length equal to or larger than L pixels and a horizontal width less than N pixels, and whether a second kind of aggregation of pixels exists in the reference area, said second kind of aggregation being an assembly of either black or white pixels covering an area having a vertical length less than N pixels and a horizontal width equal to or larger than L pixels, wherein L is 3;

determining a value representing the reference area as being at least one of (1) the value of said original center pixel if neither the first nor the second kind of aggregation is determined to exist, (2) a value of said first or second kind of aggregation if one of the two is determined to exist, and (3) a value different from the value of said original center pixel if both of the first and the second kinds of aggregations are determined to exist;

outputting the value representing the reference area; and storing the outputted value with data for pixels outside the reference area as reduced image data for a converted image.

6. The computer-implemented image data reduction and image conversion method according to claim 5, further including the step of:

reading out the stored reduced image data for display of the converted image without loss of fine lines in the converted image.

7. A high-speed binary-image processor for data-reducing images consisting of a plurality of pixels, the processor comprising:

means for receiving an input data of binary-image type;

a reduction operator for reducing the input data, including:

means for selecting a center pixel of an image represented by the input data by comparing pixels within a first region of the image with the pixels in a second region of the image, wherein the first region consists of L pixels in the vertical direction and 2N pixels in the horizontal direction and the second region consists of 2N pixels in the vertical direction and L pixels in the horizontal direction, L being an integer greater than or equal to 3 and N being an integer greater than or equal to 2;

means for detecting a fine line in the image, wherein the fine line is one of a vertical aggregation of concordant pixels in the input binary-image and a diagonal aggregation of concordant pixels in the image, wherein pixels are concordant when consisting of white pixels together or black pixels together, the center pixel not being one of the concordant pixels of the vertical aggregation or the diagonal aggregation, and means for identifying a converted pixel of the fine line, which is a pixel along a line of pixels intersecting the fine line and including the center pixel of the input binary-image, and for converting the converted pixel to a value corresponding to the center pixel of the image if the detecting means detects a fine line with a converted pixel having a value different from the value of the center pixel of the image; and means for outputting reduced data for a converted image including the converted centroid pixel.

* * * * *